United States Patent [19]

Malaspinas

[11] Patent Number: 5,784,210
[45] Date of Patent: Jul. 21, 1998

[54] MONITOR MAGNIFICATION DEVICE

[76] Inventor: Panagotis John Malaspinas, 80 Charles Ave., Massapequa Pk. N.Y. 11762

[21] Appl. No.: 885,519

[22] Filed: Jun. 30, 1997

[51] Int. Cl.$^6$ ................................................ G02B 27/02
[52] U.S. Cl. .................... 359/802; 359/808; 359/809; 359/601; 359/613; 359/822; 340/815.73; 348/834
[58] Field of Search .............................. 359/802, 804, 359/808, 809, 810, 822, 823, 601, 609, 613; 340/815.73; 348/834, 373

[56] References Cited

U.S. PATENT DOCUMENTS

| | | |
|---|---|---|
| 4,569,572 | 2/1986 | Kopich ............................. 359/601 |
| 4,577,928 | 3/1986 | Brown ............................. 359/609 |
| 5,200,859 | 4/1993 | Payner et al. ..................... 359/601 |
| 5,274,501 | 12/1993 | Stroll, Jr. ........................ 359/613 |
| 5,432,504 | 7/1995 | Shaw et al. ..................... 340/815.73 |

*Primary Examiner*—Loha Ben

[57] ABSTRACT

In its broadest context, the monitor magnification device includes a monitor cover adapted to be secured over a monitor. The cover includes an internal linearly adjustable lens which is adapted to magnify the image upon the monitor. Such an arrangement reduces the eye strain that is normally incident to focusing upon a monitor image. The various components of the present invention, and the manner in which they interrelate, will be described in greater detail hereinafter.

5 Claims, 2 Drawing Sheets

MONITOR MAGNIFICATION DEVICE

BACKGROUND OF THE INVENTION

1. Field of the Invention

The present invention relates to a new and improved monitor magnification device and, more particularly, pertains to such a device that can be positioned over a computer monitor.

2. Description of the Prior Art

The use of monitors is known in the prior art. More specifically, monitors heretofore devised and utilized for the purpose of displaying images are known to consist basically of familiar, expected, and obvious structural configurations, notwithstanding the myriad of designs encompassed by the crowded prior art which has been developed for the fulfillment of countless objectives and requirements.

The prior art discloses a large number of monitors By way of example U.S. Pat. No. 5,200,859 to Payner discloses a vision saver for a computer monitor. U.S. Pat. No. 4,717,248 to LaRussa discloses a display system for video displays. U.S. Pat. No. 4,569,572 to Kopich discloses a hood for video terminals. U.S. Pat. No. 5,274,501 to Stroll discloses a glare and eye strain prevention apparatus. U.S. Design Pat. No. 311,912 to Schmidt discloses a hood for a video monitor. Lastly, U.S. Pat. No. 5,432,504 to Shaw discloses a visual display terminal device and a method for reducing eye strain reduction.

In this respect, the magnification device according to the present invention substantially departs from the conventional concepts and designs of the prior art, and in doing so provides an apparatus primarily developed for the purpose of selectively enlarging a monitor image.

Therefore, it can be appreciated that there exists a continuing need for a new and improved magnification device which can be used for enlarging monitor images. In this regard, the present invention substantially fulfills this need.

SUMMARY OF THE INVENTION

In view of the foregoing disadvantages inherent in the known types of monitors now present in the prior art, the present invention provides a new and improved device for enlarging monitor images. As such, the general purpose of the present invention, which will be described subsequently in greater detail, is to provide a new and improved magnification device and methods which have all the advantages of the prior art and none of the disadvantages.

To attain this, the present invention essentially comprises a monitor magnification device which includes a monitor for displaying information in an inverted orientation. The device further includes a monitor cover having a rearward extent, a forward extent, an upper portion and a lower portion,wherein the lower portion of the rearward extent has an opening defined to receive the monitor. This opening is formed at an angle relative to the lower portion. A first clamp is secured to the lower portion of the rearward extent at a first side of the monitor cover, likewise a second clamp is secured to the lower portion of the rearward extent at a second side of the monitor cover. The two clamps are adapted to be secured to mating surfaces upon the monitor to thereby secure the monitor cover to the monitor. A series of vents is formed within the upper portion of the rearward extent, with the vents functioning to vent heat generated by the monitor. The monitor cover is adapted to be suspended from the monitor in a cantilevered fashion. A screen formed within the forward extent of the monitor cover. An upper U-shaped track is formed upon the upper portion at an internal surface, and a lower U-shaped track is formed upon the lower portion at an internal surface. Additionally, a lens is adapted to magnify and invert an image generated by the monitor. The lens is defined by an upper extent, a lower extent, a rearward surface and a forward surface. An upper rack is secured to the upper extent of the lens, with the upper rack positioned within the upper U-shaped track. Likewise, a lower slide is secured to the lower extent of the lens, with the lower slide positioned within the lower U-shaped track. The lens is thus adapted for linear movement within the upper and lower U-shaped tracks. The device further includes a fine adjustment knob positioned within the upper portion of the monitor cover. The knob has a lower geared extent, with the lower geared extent engaging the upper rack such that rotation of the fine adjustment knobs results in the linear movement of the both the upper rack and the lower track and thus the lens.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved magnification device which has all the advantages of the prior art monitors and none of the disadvantages.

It is another object of the present invention to provide a new and improved magnification device which may be easily and efficiently manufactured and marketed.

It is a further object of the present invention to provide a new and improved magnification device which is of a durable and reliable construction.

An even further object of the present invention is to provide a new and improved magnification device which is susceptible of a low cost of manufacture with regard to both materials and labor, and which accordingly is then susceptible of low prices of sale to the consuming public, thereby making such a magnification device economically available to the buying public.

Even still another object of the present invention is to enable a magnification device to be easily secured to a monitor.

Lastly, it is an object of the present invention to provide a monitor magnification device which includes a monitor cover adapted to be secured over a monitor. The cover includes an internal linearly adjustable lens which is adapted to magnify the image upon the monitor. Such an arrangement reduces the eye strain that is normally incident to focusing upon a monitor image. The various components of the present invention, and the manner in which they interrelate, will be described in greater detail hereinafter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
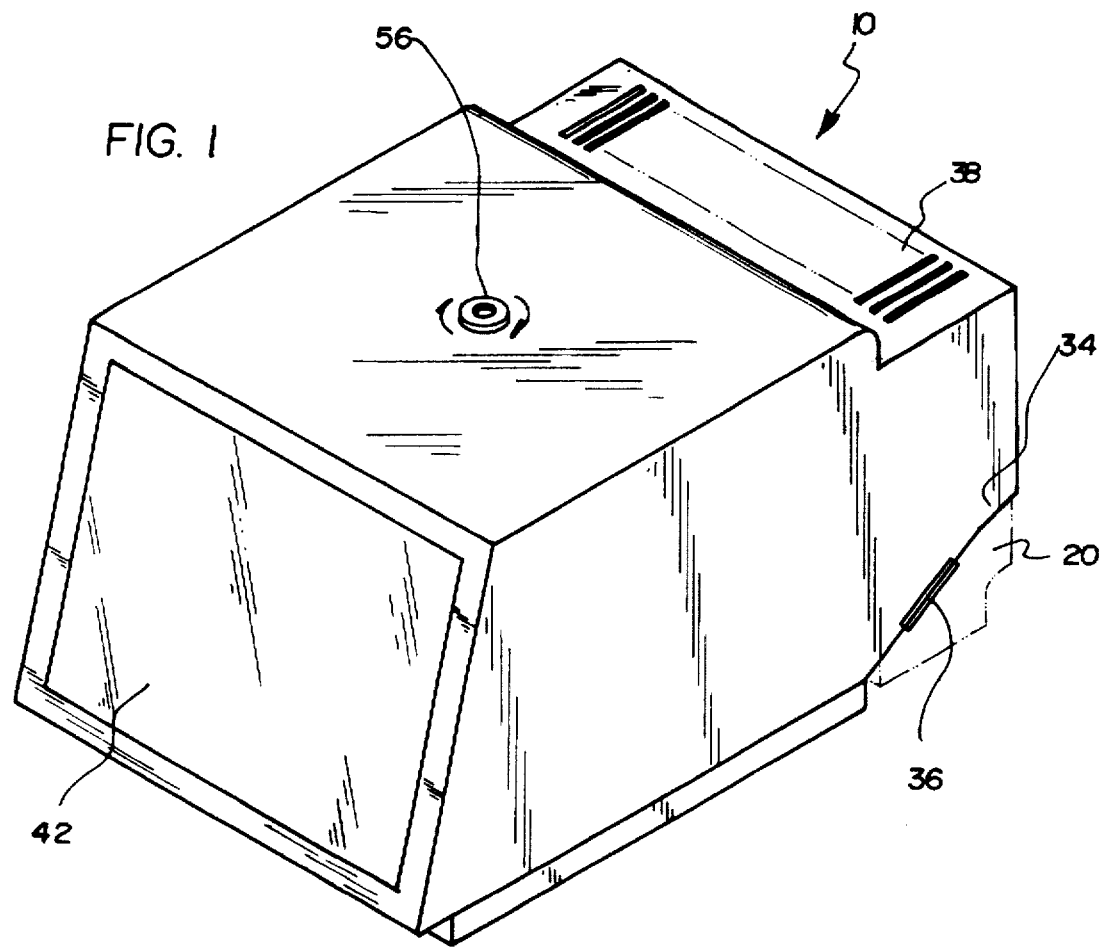
FIG. 1 is a perspective illustration of the preferred embodiment of the magnification device constructed in accordance with the principles of the present invention.

With reference now to the drawings, and in particular to FIGS. 1 through 4 thereof, the preferred embodiment of the new and improved magnification device embodying the principles and concepts of the present invention and generally designated by the reference numeral 10 will be described.

With reference now to the drawings, and in particular to FIG. 1 thereof, the monitor magnification device of the present invention is depicted. In its broadest context, the monitor magnification device includes a monitor cover adapted to be secured over a monitor. The cover includes an internal linearly adjustable lens which is adapted to magnify the image upon the monitor. Such an arrangement reduces the eye strain that is normally incident to focusing upon a monitor image. The various components of the present invention, and the manner in which they interrelate, will be described in greater detail hereinafter.

The monitor magnification device of the present invention is adapted to be used in conjunction with a monitor 20. Such a monitor 20 displays information in a conventional manner. However, in accordance with the principles of the present invention, the monitor 20 should be arranged to display in an inverted orientation. Namely, the monitor 20 should display its information in an orientation that would be upside down relative to a user employing the monitor.

The magnification of the monitor image, as well as the reversion of the monitor image, is achieved through the use of a lens arrangement within a monitor cover. The monitor cover 22 is defined by a rearward extent 24, a forward extent 26, an upper portion 28 and a lower portion 32. The lower portion 32 of the rearward extent 24 includes an opening 34 defined to receive the monitor 20. As is seen from FIG. 2, this opening 34 is formed at an angle relative to the lower portion 32 of the monitor cover 22. Such an inclination of the cover opening 34 allows the user to readily manipulate the clamps 36 which are secured to the two sides of the monitor cover 22.

More specifically, a first clamp is secured to the lower portion 32 of the rearward extent 24 at a first side of the monitor cover 22, and a second clamp is secured to the lower portion 32 of the rearward extent 24 at a second side of the monitor cover 22. These two clamps 36 are pivoted along their lengths. Each of the clamps works in conjunction with a mating surface secured to the sides of the monitor 20. Thus, the two clamps 36 are adapted to be secured to mating surfaces upon the monitor 20 to thereby secure the monitor cover 22 to the monitor 20. A user securing the monitor cover 22 to the monitor 20 would take the following steps. First, the inclined opening 34 at the rearward extent 24 of the monitor cover would be positioned over the monitor 20. Second, each of the clamps 36 would be pivoted to engage its corresponding mating surface at the side of the monitor 20. In this manner, the monitor cover 22 is securely fastened to the monitor 20. Furthermore, the monitor cover 22 is secure enough to be suspended from the monitor 20 in a cantilevered fashion. In other words, no table is needed to support the monitor cover 22.

In order to dissipate the heat generated by the monitor 20, a series of vents 38 are formed within the upper portion 28 of the rearward extent 24. These vents 38 are most clearly seen in reference to FIG. 1. With continuing reference to FIG. 1, the screen 42 of the monitor cover 22 is depicted. Specifically, the screen 42 is formed within the forward extent 26 of the monitor cover 22. The user of the device views the enlarged monitor image through this screen 42.

Figure 2:
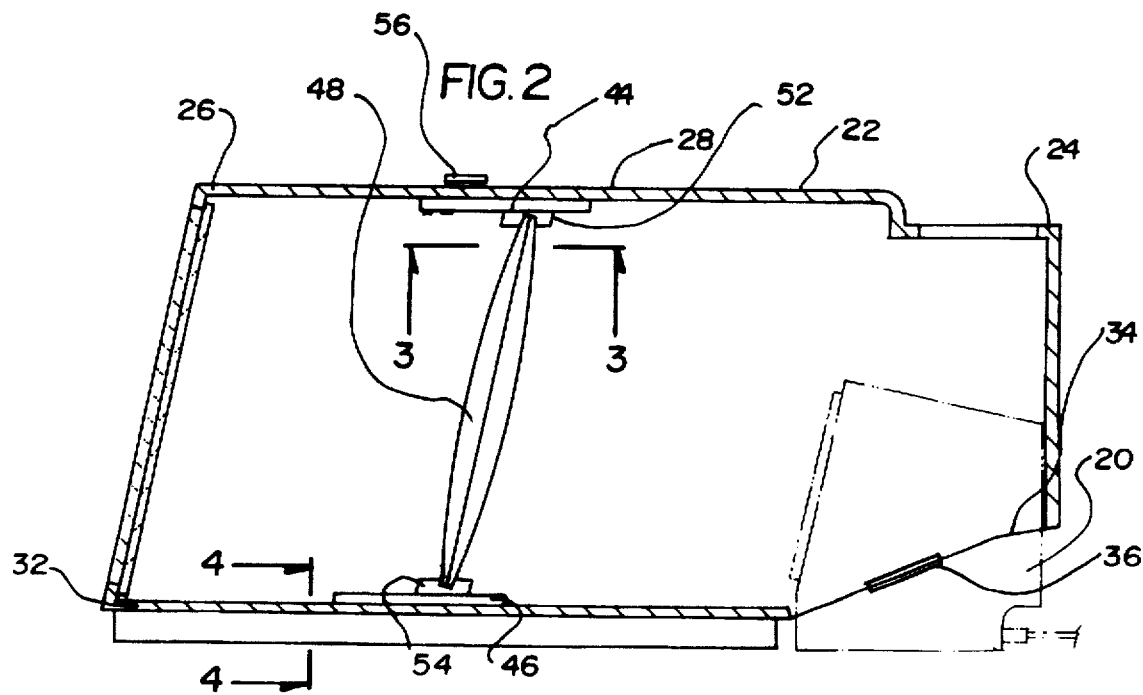
FIG. 2 is a cross section of the magnification device.

The lens 48 and its associated control means are depicted in FIG. 2. Specifically, an upper U-shaped track 44 is formed upon the upper portion 28 of the monitor cover 22 at an internal surface. Likewise, the lower U-shaped track 46 is formed upon the lower portion 32 of the monitor cover 22 at an internal surface. Through the use of an upper rack 52 and a lower slide 54, the lens 48 is adapted to be located at a desired position along the length of the two U-shaped tracks.

The lens 48 employed in the present invention is adapted to magnify and invert an image generated by the monitor 20. The inverted image from the monitor 20 is inverted to an orientation presentable to a user of the magnifying device. Furthermore, the monitor image is magnified sufficiently to reduce the eye strain normally associated with the use of a monitor. The lens 48 is depicted in FIG. 2.

The lens 48 is generally defined by an upper extent, a lower extent, a rearward surface and a forward surface. The upper rack 52 is secured to the upper extent of the lens 48. In turn, the upper rack 52 is positioned within the upper U-shaped track 44. In a similar fashion the lower slide 54 is secured to the lower extent of the lens 48. This lower slide 54 is positioned within the lower U-shaped track 46. Thus, the lens 48 is adapted for linear movement within these upper and lower U-shaped tracks.

Figure 3:
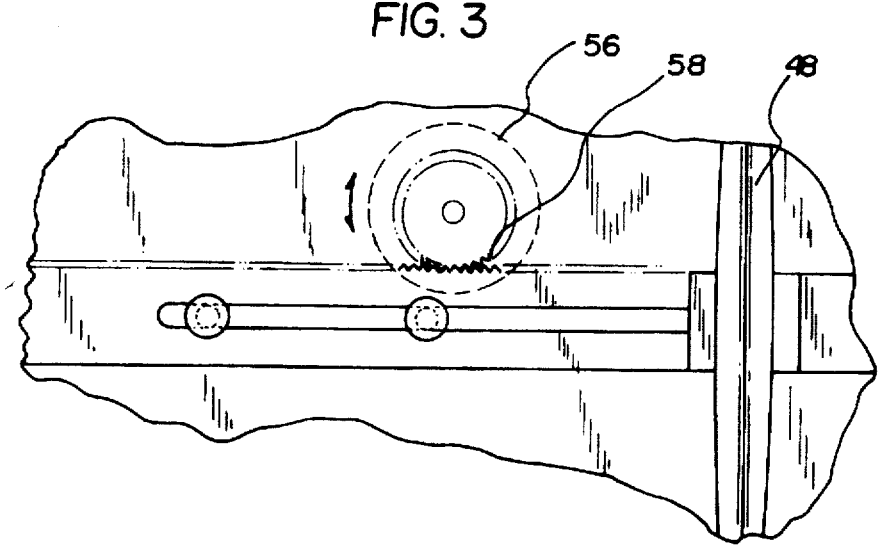
FIG. 3 is a detail of the fine adjustment knob employed with the present invention taken along line 3—3 of FIG. 2.
Figure 4:
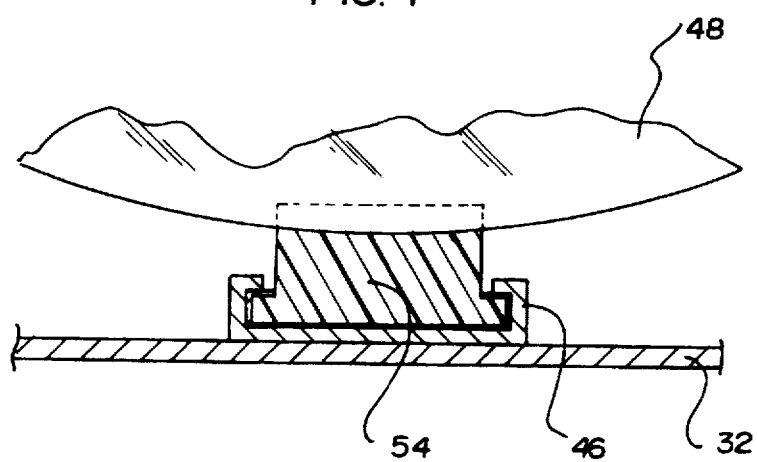
FIG. 4 is a view taken along line 4—4 of FIG. 2.

The linear adjustment of the lens relative to the monitor cover is achieved via a fine adjustment knob 56. With reference to FIG. 1, the fine adjustment knob 56 is positioned within the upper portion 28 of the monitor cover 22. With reference to FIG. 3, lower geared extent 58 of the knob 56 is depicted. This lower geared extent 58 engages the upper rack 52 such that rotation of the fine adjustment knobs 56 results in the linear movement of both the upper rack 52 and the lower slide 54 and thus the lens 48. In this manner, the lens 48 can be positioned closer to, or farther away from, the monitor 20 to thus adjust the amount of magnification desired.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A monitor magnification device comprising in combination:

a monitor for displaying information in an inverted orientation;

a monitor cover having a rearward extent, a forward extent, an upper portion and a lower portion, the lower portion of the rearward extent having an opening defined to receive the monitor, the opening being formed at an angle relative to the lower portion, a first clamp secured to the lower portion of the rearward extent at a first side of the monitor cover, and a second clamp secured to the lower portion of the rearward extent at a second side of the monitor cover, the two clamps adapted to be secured to mating surfaces upon the monitor to thereby secure the monitor cover to the monitor, a series of vents formed within the upper portion of the rearward extent, the vents functioning to vent heat generated by the monitor, the monitor cover adapted to be suspended from the monitor in a cantilevered fashion;

a screen formed within the forward extent of the monitor cover;

an upper U-shaped track formed upon the upper portion at an internal surface thereof, and a lower U-shaped track formed upon the lower portion at an internal surface;

a lens adapted to magnify and invert an image generated by the monitor, the lens having an upper extent, a lower extent, a rearward surface and a forward surface, an upper rack secured to the upper extent of the lens, the upper rack positioned within the upper U-shaped track, a lower slide secured to the lower extent of the lens, the lower slide positioned within the lower U-shaped track, the lens thus adapted for linear movement within the upper and lower U-shaped tracks;

a fine adjustment knob positioned within the upper portion of the monitor cover, the knob having a lower geared extent, the lower geared extent engaging the upper rack such that rotation of the fine adjustment knob results in the linear movement of both the upper rack and the lower track and thus the lens.

2. A monitor magnification device comprising in combination:

a monitor for displaying information in an inverted orientation;

a monitor cover having a rearward extent, a forward extent, an upper portion and a lower portion, the lower portion of the rearward extent having an opening defined to receive the monitor, the opening being formed at an angle relative to the lower portion, a series of vents formed within the upper portion of the rearward extent, the vents functioning to vent heat generated by the monitor;

a screen formed within the forward extent of the monitor cover;

an upper U-shaped track formed upon the upper portion at an internal surface thereof, and a lower U-shaped track formed upon the lower portion at an internal surface;

a lens adapted to magnify and invert an image generated by the monitor, the lens having an upper extent, a lower extent, a rearward surface and a forward surface, an upper rack secured to the upper extent of the lens, the upper rack positioned within the upper U-shaped track, a lower slide secured to the lower extent of the lens, the lower slide positioned within the lower U-shaped track, the lens thus adapted for linear movement within the upper and lower U-shaped tracks;

a means for adjusting the position of the lens within the monitor cover.

3. The monitor cover as described in claim 2 further comprising:

a first clamp secured to the lower portion of the rearward extent at a first side of the monitor cover, and a second clamp secured to the lower portion of the rearward extent at a second side of the monitor cover, the two clamps adapted to be secured to mating surfaces upon the monitor to thereby secure the monitor cover to the monitor.

4. The monitor cover as described in claim 2 wherein:

the means for adjusting takes the form of a fine adjustment knob positioned within the upper portion of the monitor cover, the knob having a lower geared extent, the lower geared extent engaging the upper rack such that rotation of the fine adjustment knob results in the linear movement of both the upper rack and the lower track and thus the lens.

5. The monitor cover as described in claim 2 wherein:

the monitor cover is adapted to be suspended from the monitor in a cantilevered fashion.

* * * * *